(12) United States Patent
Han et al.

(10) Patent No.: US 11,582,052 B2
(45) Date of Patent: Feb. 14, 2023

(54) METHOD, SYSTEM, AND NON-TRANSITORY COMPUTER READABLE RECORD MEDIUM FOR MANAGING MESSAGES BASED ON CONTEXT

(71) Applicant: LINE Plus Corporation, Seongnam-si (KR)

(72) Inventors: Seung Wook Han, Seongnam-si (KR); Su Ahn Lee, Seongnam-si (KR); Youngsub Park, Seongnam-si (KR); Jae Yun Jung, Seongnam-si (KR); Hee Jong Lee, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 17/307,633

(22) Filed: May 4, 2021

(65) Prior Publication Data
US 2021/0258181 A1    Aug. 19, 2021

Related U.S. Application Data

(63) Continuation of application No. PCT/KR2018/013590, filed on Nov. 9, 2018.

(51) Int. Cl.
*H04L 12/18* (2006.01)
(52) U.S. Cl.
CPC ................ *H04L 12/1822* (2013.01)
(58) Field of Classification Search
CPC .................................................. H04L 12/1822
See application file for complete search history.

(56) References Cited

U.S. PATENT DOCUMENTS

| 10,298,529 | B2 * | 5/2019 | Lee .......................... H04L 51/16 |
| 10,621,272 | B1 * | 4/2020 | Rose ................... H04L 63/0807 |
| 10,742,732 | B1 * | 8/2020 | Lindeman ............ H04L 67/125 |
| 2002/0054117 | A1 | 5/2002 | Van Dantzich et al. |
| 2003/0154250 | A1 * | 8/2003 | Miyashita ............... H04L 51/04 709/204 |
| 2005/0262203 | A1 * | 11/2005 | Buchheit ................. G06F 16/24 709/206 |

(Continued)

FOREIGN PATENT DOCUMENTS

| KR | 10-2002-0074304 A | 9/2002 |
| KR | 10-2005-0041469 A | 5/2005 |

(Continued)

OTHER PUBLICATIONS

International Search Report dated Aug. 9, 2019 by the International Searching Authority in International Application No. PCT/KR2018/013590 (PCT/ISA/210).

(Continued)

*Primary Examiner* — Jonathan A Bui
(74) *Attorney, Agent, or Firm* — Sughrue Mion, PLLC

(57) ABSTRACT

A message management method includes receiving, by at least one processor of a computer system, a share request for a message group that includes at least one message among messages in a chatroom; and forwarding, by the at least one processor, based on receiving the share request, information about the message group to a server which stores the information about the message group in association with the chatroom and shares the message group with users in the chatroom.

19 Claims, 17 Drawing Sheets

(56) References Cited

U.S. PATENT DOCUMENTS

| | | | |
|---|---|---|---|
| 2010/0005402 A1* | 1/2010 | George | H04L 51/04 715/758 |
| 2010/0332518 A1 | 12/2010 | Song et al. | |
| 2011/0256907 A1 | 10/2011 | Lee et al. | |
| 2013/0185363 A1* | 7/2013 | DeLuca | H04L 51/16 709/206 |
| 2013/0332856 A1* | 12/2013 | Sanders | G06F 3/0488 715/753 |
| 2014/0006525 A1* | 1/2014 | Freund | H04L 51/16 709/206 |
| 2014/0068468 A1* | 3/2014 | Yoon | H04L 65/403 715/758 |
| 2015/0271112 A1* | 9/2015 | Liu | H04W 4/08 709/204 |
| 2016/0277343 A1* | 9/2016 | Ji | G06F 3/04883 |
| 2016/0337291 A1* | 11/2016 | Park | H04L 51/32 |
| 2017/0054664 A1* | 2/2017 | Lee | H04L 51/216 |
| 2017/0353410 A1* | 12/2017 | Gonzales | H04L 51/22 |
| 2018/0241871 A1* | 8/2018 | Sarafa | H04L 51/26 |
| 2019/0098087 A1* | 3/2019 | Johnston | G06Q 10/107 |
| 2019/0138160 A1* | 5/2019 | Deets, Jr. | G06F 3/0482 |
| 2019/0327198 A1* | 10/2019 | Connor | H04L 51/32 |
| 2020/0026783 A1* | 1/2020 | Watanabe | H04L 67/2804 |
| 2020/0128050 A1* | 4/2020 | Balasaygun | H04L 65/1096 |

FOREIGN PATENT DOCUMENTS

| | | |
|---|---|---|
| KR | 10-2011-0116377 A | 10/2011 |
| KR | 10-1143167 B1 | 7/2012 |
| KR | 10-2014-0113155 A | 9/2014 |
| KR | 10-2016-0075457 A | 6/2016 |
| KR | 10-2017-0045880 A | 4/2017 |

OTHER PUBLICATIONS

Office Action dated Dec. 14, 2022 from the Korean Intellectual Property Office in KR Application No. 10-2021-7011178.

* cited by examiner

METHOD, SYSTEM, AND NON-TRANSITORY COMPUTER READABLE RECORD MEDIUM FOR MANAGING MESSAGES BASED ON CONTEXT

CROSS-REFERENCE TO RELATED APPLICATION

This application is a continuation application of International Application No. PCT/KR2018/013590, filed Nov. 9, 2018, the disclosure of which is incorporated by reference herein in its entirety.

BACKGROUND

1. Field

Apparatuses and methods consistent with example embodiments of the relate to managing messages, and in particular to a method of grouping messages within a chatroom and sharing the message groups with users in the chatroom.

2. Description of Related Art

An instant messenger that is a general communication tool refers to software capable of sending and receiving messages or data in real time, and allows a user to register a contact on a messenger and to exchange a message in real time with a counterpart included in a contact list.

Such a messenger function is common in a mobile environment of a mobile communication terminal as well as a personal computer (PC).

For example, a method and system for a mobile messenger service of a portable terminal using a wireless communication system that may provide a messenger service between mobile messengers installed on portable terminals are described in the related art.

In general, the messenger provides a list of contacts that are registered on the messenger in order of names for user convenience and also provides a list of chatrooms in which messages are sent and received based on a time at which a corresponding message is received or sent.

SUMMARY

Provided is a message management environment capable of grouping messages sent and received in a chatroom between users participating in the chatroom.

According to an aspect of the disclosure a message management method may include receiving, by at least one processor of a computer system, a share request for a message group that includes at least one message among messages in a chatroom; and forwarding, by the at least one processor, based on receiving the share request, information about the message group to a server which stores the information about the message group in association with the chatroom and shares the message group with users in the chatroom.

The receiving may include displaying, by a user interface of the computer system, a list of at least one message group including the requested message group for selection by a user; and receiving, through the user interface, a selection of the requested message group from among the at least one listed message group.

The receiving may include grouping the messages in the chatroom, based on a message time, into at least one message group; displaying, by a user interface of the computer system, a list of the at least one message group; and receiving, through the user interface, a specific user input which selects the requested message group from among the at least one message group.

The receiving may include grouping the messages in the chatroom, based on a keyword input from a user, into at least one message group; displaying, by a user interface of the computer system, a list of the at least one message group; and receiving, through the user interface, a specific user input which selects the requested message group from among the at least one message group.

The receiving may include displaying, by a user interface of the computer system, at least one editing message to be added to the message group from among the messages in the chatroom or the at least one editing message to be deleted from the message group from among the messages in the message group; and receiving, through the user interface, a selection of the at least one editing message.

The method may further include receiving, through a first screen of a user interface of the computer system, a message group reading request from a user; displaying, based on receiving the message group reading request, a second screen of the user interface, the second screen comprising a message group list associated with the chatroom; receiving, through the second screen of the user interface, a selection of a specific message group from the message group list; acquiring, from the server, based on receiving the selection of the specific message group, information about the specific message group; and displaying, by the user interface, one or more messages of the specific message group in an order of a corresponding message time based on the information about the specific message group.

The method may further include storing a last reading time of the message group; and displaying at least one message in the message group with a different graphic effect than remaining messages in the message group based on the last reading time.

Each message in the message group may include time information that is updated for the message group. The displaying may include comparing the last reading time and the time information; determining, based on the comparison of the last reading time and the time information, a presence or an absence of a message updated after the last reading time in the message group; and displaying the message updated after the last reading time with a different graphic effect than a previously existing message in the message group.

The displaying may include comparing a message time for each message and the last reading time of the message group; determining, based on the message times and the last reading time, a presence or an absence of an unread message in the message group; and displaying, based on determining the presence of the unread message, the unread message with a different graphic effect than a read message in the message group.

According to another aspect of the disclosure, a non-transitory computer-readable record medium may store instructions that, when executed by a processor, cause the processor to perform the message management method.

According to another aspect of the disclosure, a computer system may include a memory configured to store computer-readable instructions; and at least one processor configured to execute the computer-readable instructions to; to receive a share request for a message group that includes at least one message among messages in a chatroom; and forward, based on receiving the share request, information about the message group to a server which stores the information about the message group in association with the chatroom and shares the message group with users in the chatroom.

The at least one processor is further configured to: control a user interface to display a list of at least one message group including the requested message group for selection by a user; and receive, through the user interface, a selection of the requested message group from among the at least one listed message group.

The at least one processor may be further configured to: group the messages in the chatroom, based on a message time or a keyword input from a user; into at least one message group; control a user interface to display a list of the at least one message group; and receive, through the user interface, a specific user input which selects the requested message group from among the at least one message group.

The at least one processor may be further configured to: control a user interface to display at least one editing message to be added to the message group from among the messages in the chatroom or the at least one editing message to be deleted from the message group from among the messages in the message group, and receive, through the user interface, a selection of the at least one editing message.

The at least one processor may be further configured to; receive, through a first screen of a user interface, a message group reading request from a user; control the user interface to display, based on receiving the message group reading request, a second screen of the user interface, the second screen comprising a message group list associated with the chatroom; receive, through the second screen of the user interface, a selection of a specific message group from the message group list, acquire, from the server, based on receiving the selection of the specific message group, information about the specific message group, and control the user interface to display one or more messages of the specific message group in an order of a corresponding message time based on the information about the specific message group.

The at least one processor may be further configured to: store a last reading time of the message group; and control a user interface to display at least one message in the message group with a different graphic effect than remaining messages in the message group based on the last reading time.

Each message in the message group may include time information that is updated for the message group. The at least one processor is further configured to: compare the last reading time and the time information; and control the user interface to display a message updated after the last reading time with a different graphic effect than a previously existing message in the message group.

The at least one processor may be further configured to: compare a message time for each message and the last reading time of the message group; determine, based on the message times and the last reading time, a presence or an absence of an unread message in the message group; and control the user interface to display, based on determining the presence of the unread message, the unread message with a different graphic effect than a read message in the message group.

According to another aspect of the disclosure, a message management method may include receiving, by a server, information about at least one message group, the at least one message group including at least one message among messages in a chatroom; storing, by the server, the information about the at least one message group in association with the chatroom; receiving, by the server, a share request for a message group among the at least one message group; sharing, by the server, based on receiving the share request, the message group with users in the chatroom.

The sharing may include sharing the message group through a service channel allocated to the chatroom.

BRIEF DESCRIPTION OF THE FIGURES

The above and/or other aspects will be more apparent by describing certain example embodiments, with reference to the accompanying drawings, in which.

Figure 1:
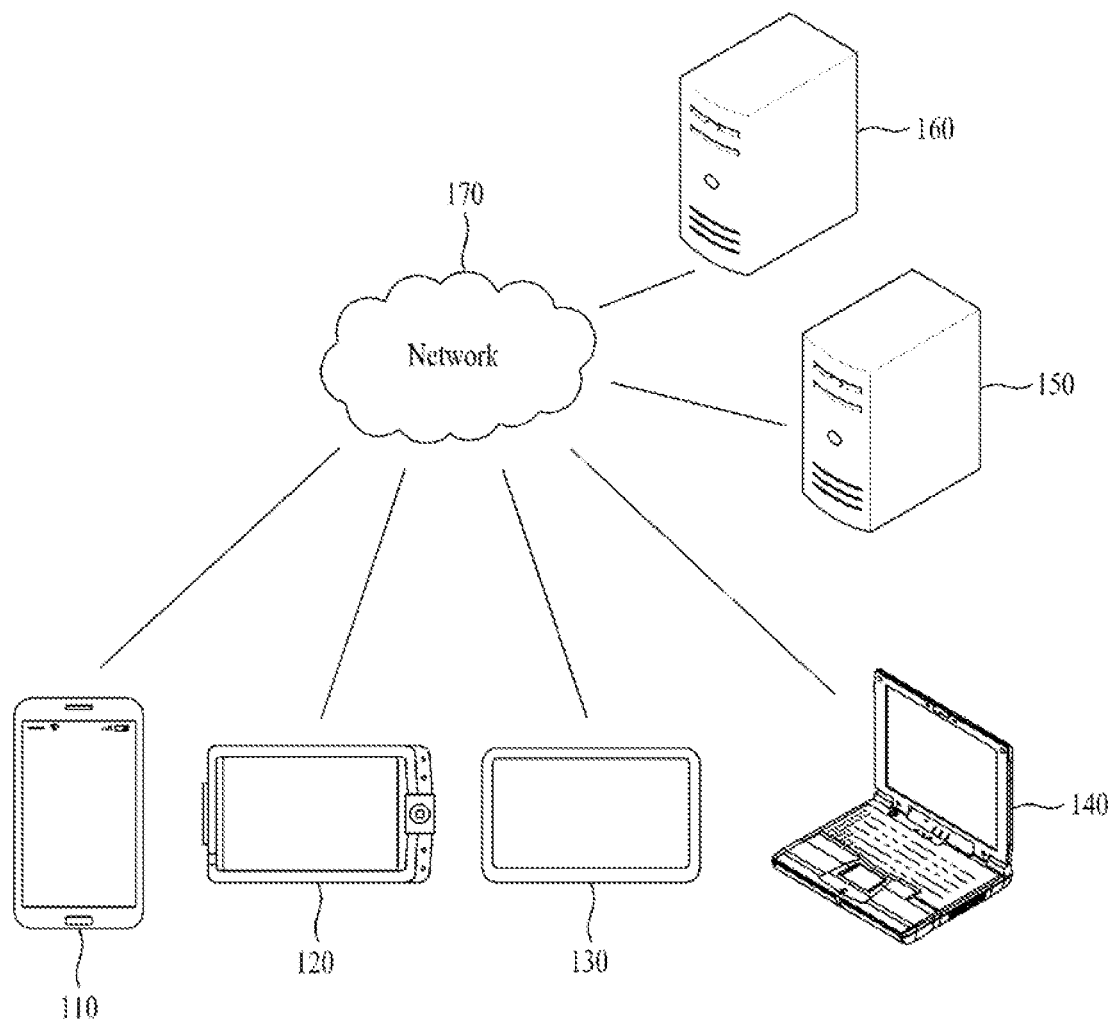
FIG. 1 is a diagram showing an example of a network environment according to example embodiments.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath." "below," "lower," "under," "above," "upper." and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises," "includes," "comprising," and/or "including," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, afield programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion.

In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to forward and/or distribute the computer programs, program code, instructions, or some combination thereof, over a network. The remote computing system may forward and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device, however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for managing messages and, more particularly, to technology for providing a message management environment capable of grouping messages exchanged between users that participate in a chatroom for each topic.

The example embodiments including the disclosures described herein may provide a message management environment capable of grouping messages exchanged between users that participate in a chatroom for each topic and may achieve many advantages in terms of convenience, efficiency, resource reduction, and cost saving.

FIG. 1 shows an example of a network environment according to example embodiments. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the client device 210, the client device 210 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, or the like, through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, for example, the server 150 may provide, as the first service, a service (e.g., a messaging service) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
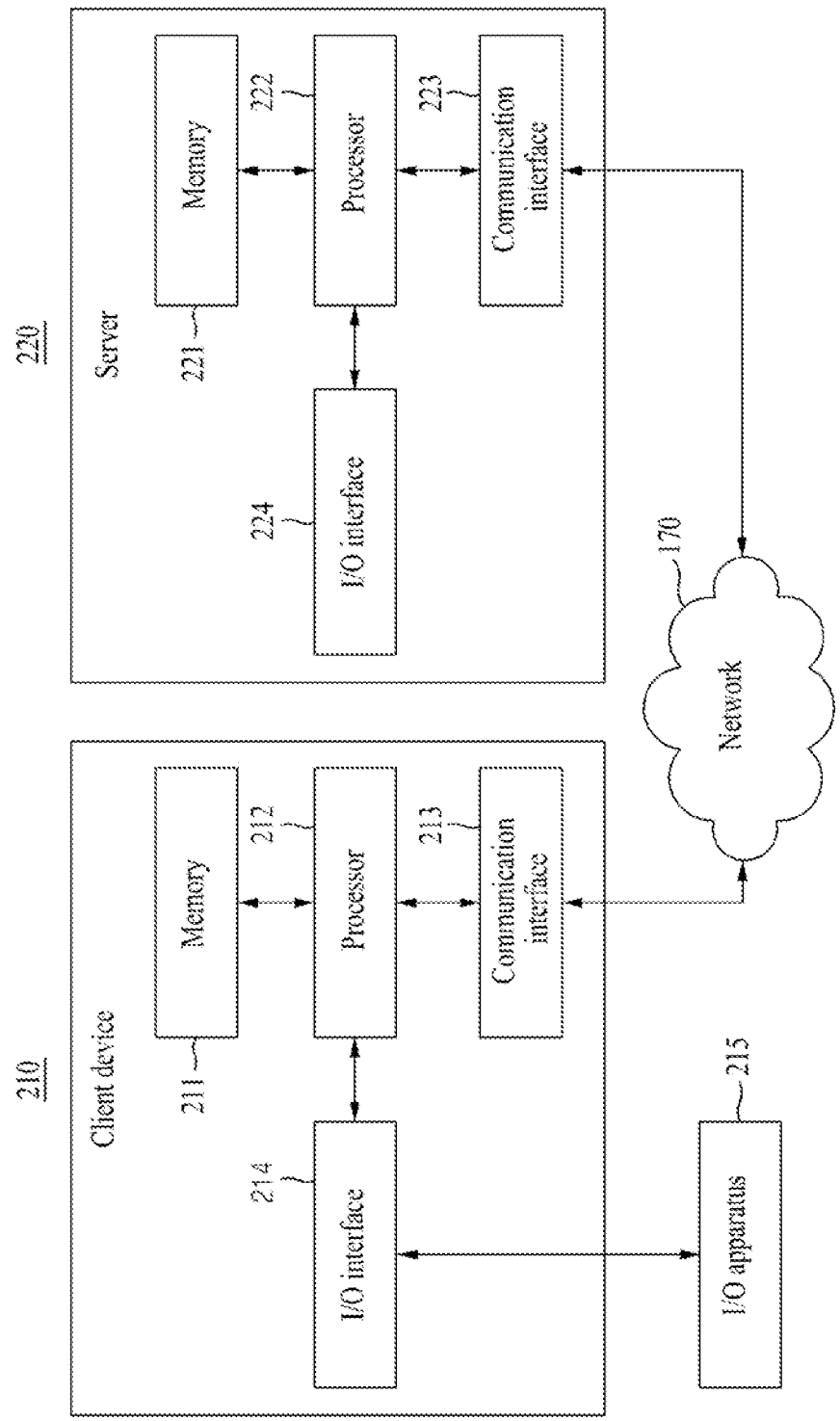
FIG. 2 is a diagram showing an example of an electronic device and a server according to example embodiments.

FIG. 2 is a block diagram showing an example of a client device 210 and a server 220 according to example embodiments. The client device 210 may correspond to any of the electronic device 110 120, 130, and 140 shown in FIG. 1, and the server 220 may correspond to any of the servers 150 and 160 shown in FIG. 1.

Referring to FIG. 2, the client device 210 may include a memory 211, a processor 212, a communication interface 213, and an input/output (I/O) interface 214, and the server 220 may include a memory 221, a processor 222, a communication interface 223, and an I/O interface 224. The memory 211, 221 may include a permanent mass storage device, such as a random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the client device 210 or the server 220 as a permanent storage device separate from the memory 211, 221. Also, an OS and at least one program code, for example, a code for a browser installed and executed on the client device 210 or an application installed and executed on the client device 210 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication interface 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication interface 213, 223 to the processor 212, 222. For example, the processor 212, 222 may be configured to execute received instructions in response to the program code stored in the storage device, such as the memory 211, 221.

The communication interface 213, 223 may provide a function for communication between the client device 210 and the server 220 over the network 170 and may provide a function for communication between the client device 210 and another client device or another server, and between the server 220 and another client device. For example, the processor 212 of the client device 210 may forward a request created based on a program code stored in the storage device such as the memory 211, to the server 220 over the network 170 under control of the communication interface 213. Inversely, a control signal, an instruction, content, a file, etc., provided under control of the processor 222 of the server 220 may be received at the client device 210 through the communication interface 213 of the client device 210 by going through the communication interface 223 and the network 170. For example, a control signal, an instruction, content, a file, etc., of the server 220 received through the communication interface 213 may be forwarded to the processor 212 or the memory 211, and content, a file, etc., may be stored in a storage medium, for example, the permanent storage device, further includable in the client device 210.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the client device 210. Also, the I/O interface 224 of the server 220 may be a device for interface with an apparatus for input or output that may be connected to the server 220 or included in the server 220. In detail, when the processor 212 of the client device 210 processes an instruction of a computer program loaded to the memory 211, content or a service screen configured based on data provided from the server 220 or the electronic device 120 may be displayed on the display through the I/O interface 214.

According to other example embodiments, the client device 210 and the server 220 may include a number of components greater than or less than a number of components shown in FIG. 2. However, there is no need to clearly illustrate many components according to the related art. For example, the client device 210 may include at least a portion of the I/O apparatus 215, or may further include other components, for example, a transceiver, a global positioning system (GPS) module, a camera, a variety of sensors, a database (DB), and the like. In detail, if the client device 210 is a smartphone, the client device 210 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, example embodiments of a method and system for managing a message group are described.

When a large number of users participate in a chatroom or when an active conversation is ongoing in the chatroom, many messages unread by a user may be accumulated. Also, a user that joins in a conversation late may need to read the accumulated messages from the beginning.

Since reading the accumulated messages from the beginning is not a good experience as a conversation-based service, an environment in which users may directly collect messages sent and received in a chatroom by topic may be required.

The example embodiments may provide a message management function for grouping messages sent and received in a chatroom for each topic between users participating in the corresponding chatroom. The message management function may group, into a single group, messages sent and received in the chatroom that correspond to a topic and may set the topic of chat contents as a title of the corresponding group. Here, the message group may be shared between users participating in the corresponding chatroom through a service channel allocated for managing messages in the chatroom and may be updated through a modification, such as a message addition or deletion.

Here, a user that verifies messages of a chatroom late or newly joins in a conversation may not need to read accumulated messages from the beginning. Instead, messages that existing users of a chatroom desire to share may be grouped through the message management function. In this manner, high user experience may be provided by making relevant messages more easily available.

In the present specification, a chatroom may refer to an interface screen for providing messages sent and received between users. For example, a representative example of the chatroom may correspond to an interface screen for displaying messages sent and received through a communication session set between accounts of users in a messenger or a social networking service (SNS) or an interface screen for displaying messages sent and received with a contact of a corresponding telephone number based on the telephone number in a text function, such as a short message service (SMS) or a multimedia message service (MMS).

Hereinafter, although a chatroom of a messenger is described, it is provided as an example only. Any conversation-based interface of a service in which a plurality of users participates and new participation frequently occurs based on an account or a telephone number of a user may be applied.

Figure 3:
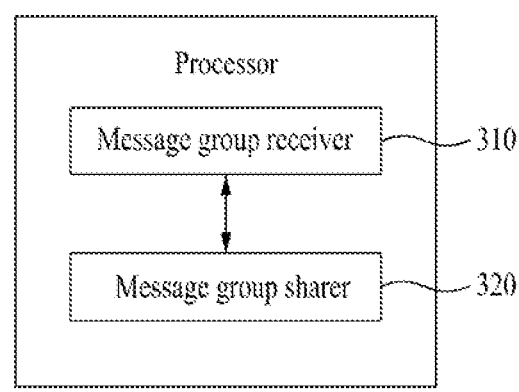
FIG. 3 is a diagram showing an example of components includable in a processor of an electronic device according to example embodiments.
Figure 4:
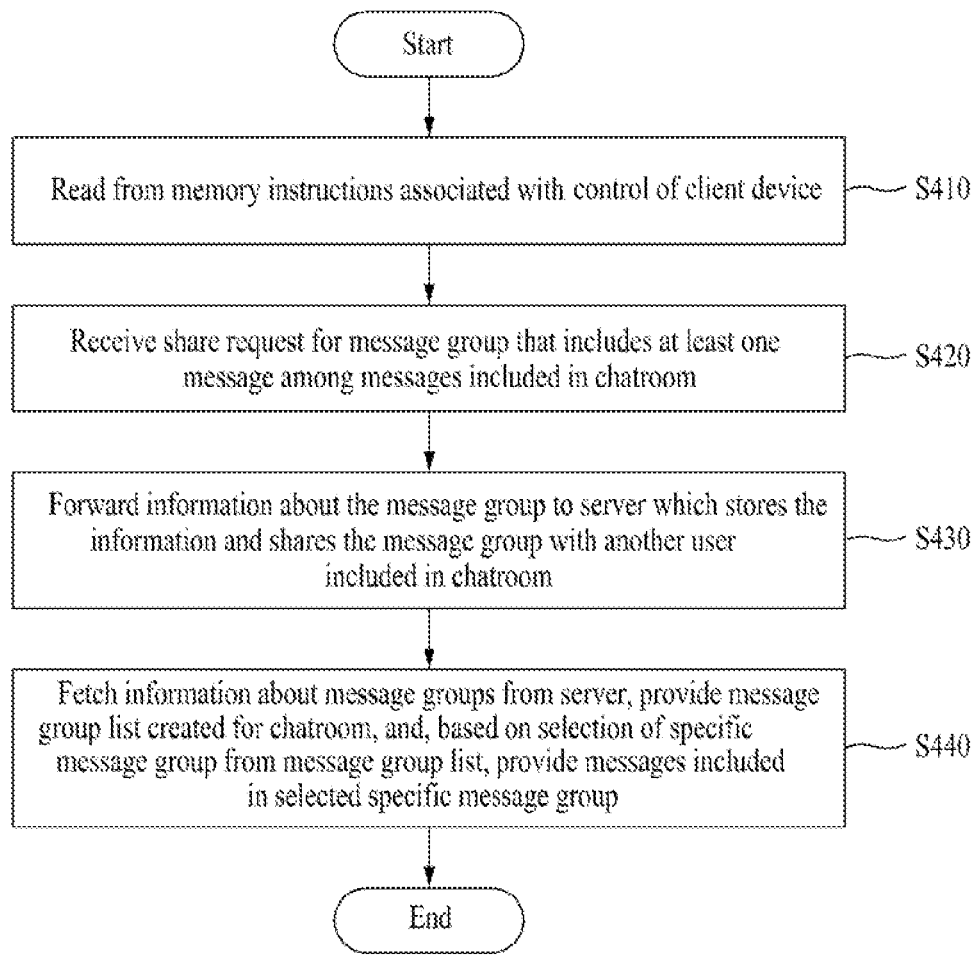
FIG. 4 is a flowchart showing an example of a method performed by an electronic device according to example embodiments.

FIG. 3 is a diagram showing an example of components includable in a processor 212 of a client device 210 according to example embodiments, and FIG. 4 is a flowchart showing an example of a method performed by an client device 210 according to example embodiments.

A message management system may be configured in the client device 210 according to an example embodiment. For example, the message management system may be provided in a computer program that independently operates or may be provided in an in-app form of a specific application to be operable on the specific application and may provide a messaging service through interaction with the server 220.

The message management system implemented in the client device 210 may perform a message management method of FIG. 4 in response to an instruction provided from the application installed on the client device 210.

Referring to FIG. 3, to perform the message management method of FIG. 4, the processor 212 of the client device 210 may include a message group receiver 310 and a message group sharer 320. Depending on example embodiments, the components of the processor 212 shown in FIG. 3 may be selectively included in or excluded from the processor 212. Also, depending on example embodiments, the components of the processor 212 shown in FIG. 3 may be separated or merged for representations of functions of the processor 212.

The processor 212 and the components of the processor 212 may control the client device 210 to perform operations S410 to S440 included in the message management method of FIG. 4. For example, the processor 212 and the components of the processor 212 may be configured to execute an instruction according to a code of at least one program and a code of an OS included in the memory 211.

Here, the components of the processor 212 may be representations of different functions of the processor 212 performed by the processor 212 in response to an instruction provided from the program code stored in the client device 210, for example, an instruction provided from an application executed on the client device 210. For example, the message group receiver 310 may be used as a functional representation of the processor 212 that controls the client device 210 to create a message group in response to the instruction.

In operation S410, the processor 212 may read a necessary instruction from the memory 211 to which instructions associated with control of the client device 210 are loaded. In this case, the read instruction may include an instruction for controlling the processor 212 to perform the following operations S420 to S440.

In operation S420, the message group receiver 310 may receive a share request for a message group that includes at least one message among messages included in a chatroom with respect to the corresponding chatroom of a messenger installed on the client device 210. For example, the message group receiver 310 may provide a user interface that allows a user of the client device 210 to directly select at least one message from among messages included in the chatroom and, when the user directly selects at least one message through the user interface, may receive a selection on the at least one message as the share request for the message group.

As another example, the message group receiver 310 may group messages included in the chatroom based on a message time and may represent at least one message among the messages included in the corresponding chatroom as belonging to the message group and may receive a specific user input related to presenting of the message group based on the message time as the share request for the message group. That is, the message group receiver 310 may group messages in the chatroom based on the message time and may provide a grouping result to the user.

The user may requesting sharing of the grouping result and edit the group results by adding or deleting a message to or from the grouping result, and may request sharing of the edited message group. The message time may represent a message transmission time in the case of an outgoing message and may represent a message reception time in the case of an incoming message.

As another example, the message group receiver 310 may group messages included in the chatroom based on a keyword input from the user of the client device 210 and may present at least one message among the messages included in the corresponding chatroom as belonging to the message group. The message group receiver 310 may also receive a specific user input related to presenting of the message group based on the message time as the share request for the message group. The message group receiver 310 may group a message corresponding to a keyword input from the user, for example, a message that includes a keyword identical or similar to the input keyword in the chatroom and may provide a grouping result to the user.

The user may request sharing of the corresponding message group using the grouping result as is or using edition, such as a message addition or deletion. The message group receiver 310 may automatically group, as a default group, messages selected based on a message time or a keyword from among messages included in the chatroom and may provide an edition function for the automatically grouped message group. The message group receiver 310 may delete at least a portion of the messages included in the default group or may add at least one message among the messages included in the corresponding chatroom to the default group. The message group receiver 310 may receive, from the user, a title that represents context or subject of messages grouped into the message group and may set the received title as a name of the corresponding message group. The user of the client device 210 may select a message group that the user desires to share with another user participating in a corresponding chatroom for each chatroom of the messenger and, in response to receiving a share request for the message group, may set a name of the message group as common context or subject of grouped messages.

In operation S430, in response to the share request received in operation S420, the message group sharer 320 may forward, to the server 220, information about the message group that includes at least one message included in the chatroom, such that the server 220 may store information about the message group in a database related to the server 220 in association with the chatroom for sharing the message group between users included in the corresponding chatroom. The message group receiver 320 may forward, to the server 220, an identifier (id) of each message included in the message group and a name of the message group with an identifier of the chatroom to which the corresponding message group belongs. Therefore, the server 220 may assign an identifier for identifying the message group, may store an identifier of grouped messages as a data structure, and manage the same as the message group in the chatroom. Additionally, the server 220 may set a name designated by the user to the corresponding message group.

The grouped messages may be managed in the server 220 in a form of data as represented in the following Table 1.

TABLE 1

```
class MessageGroup
{
String title;
Set<MessageId, UpdatedTime> messages;
}
```

In Table 1, MessageId denotes a message identifier and Updated Time denotes a final update time of each message according to creation or modification (addition/deletion) of the message group. Each message group may be managed based on an identifier of a corresponding group message (MessageGroupId) and an identifier of a belonged chatroom (RoomId).

With respect to each chatroom on the messenger, the server 220 may provide a service by guaranteeing a unique identifier of each of messages sent and received through a corresponding chatroom, and by guaranteeing a unique identifier of a message group uploaded by grouping messages by a single user in the corresponding chatroom, and thereby enabling a message group to be shared between users participating in the corresponding chatroom. Users participating in the chatroom may create the message group by grouping messages included in the chatroom and may also add another message in the chatroom to a previously created message group or may delete an existing message included in the message group. The message group receiver 310 may provide a user interface that allows the user of the client device 210 to select at least one other message to be added to the message group from among messages included in the chatroom or to select at least one other message to be deleted from the message group from among the messages included in the message group. Also, the message group receiver 310 may receive a selection on a message to be added or deleted through the corresponding user interface and may edit the corresponding message group.

In operation S440, the message group sharer 320 may fetch, from the server 220, information about a message groups corresponding to a request from the user of the client device 210, may provide a message group list created for the chatroom, and, in response to a selection of a specific message group from the message group list, may provide messages included in the specific message group. When the user requests to read a message group through the chatroom, the message group sharer 320 may receive the message group reading request and may provide a user interface that includes a message group list associated with the chatroom in response to the received message group reading request. When a specific message group is selected from the message group list through the corresponding user interface, the message group sharer 320 may acquire information about the selected message group from the server 220 and may display messages included in the message group in order of the respective message transmission and reception times based on information about the message group.

The message group may be registered in a form of a set in association with a service channel of a chatroom to which the corresponding message group belongs. When the user browses the service channel of the chatroom, name information of message groups belonging to the chatroom may be displayed in a form of a list. When the user selects a name of a specific message group, the message group sharer 320 may fetch a corresponding message from the server 220 based on a message identifier included in the selected specific message group and may display the message in order of a corresponding message transmission and reception time. A user interface that displays messages included in the message group may be in a form identical or similar to a chatroom of the messenger. The client device 210 may configure the user interface and may display conversation details through the user interface based on message information forwarded from the server 220.

A message management function according to an embodiment may provide an environment capable of sharing a message group created by directly grouping, by a user, a portion of messages sent and received in a chatroom through a service channel of the corresponding chatroom. The environment may also be capable of managing the message group and displaying the message so it can be read by a user. That is, the message management function provides an environment for viewing messages included in the chatroom based on a message group unit.

Figure 5:
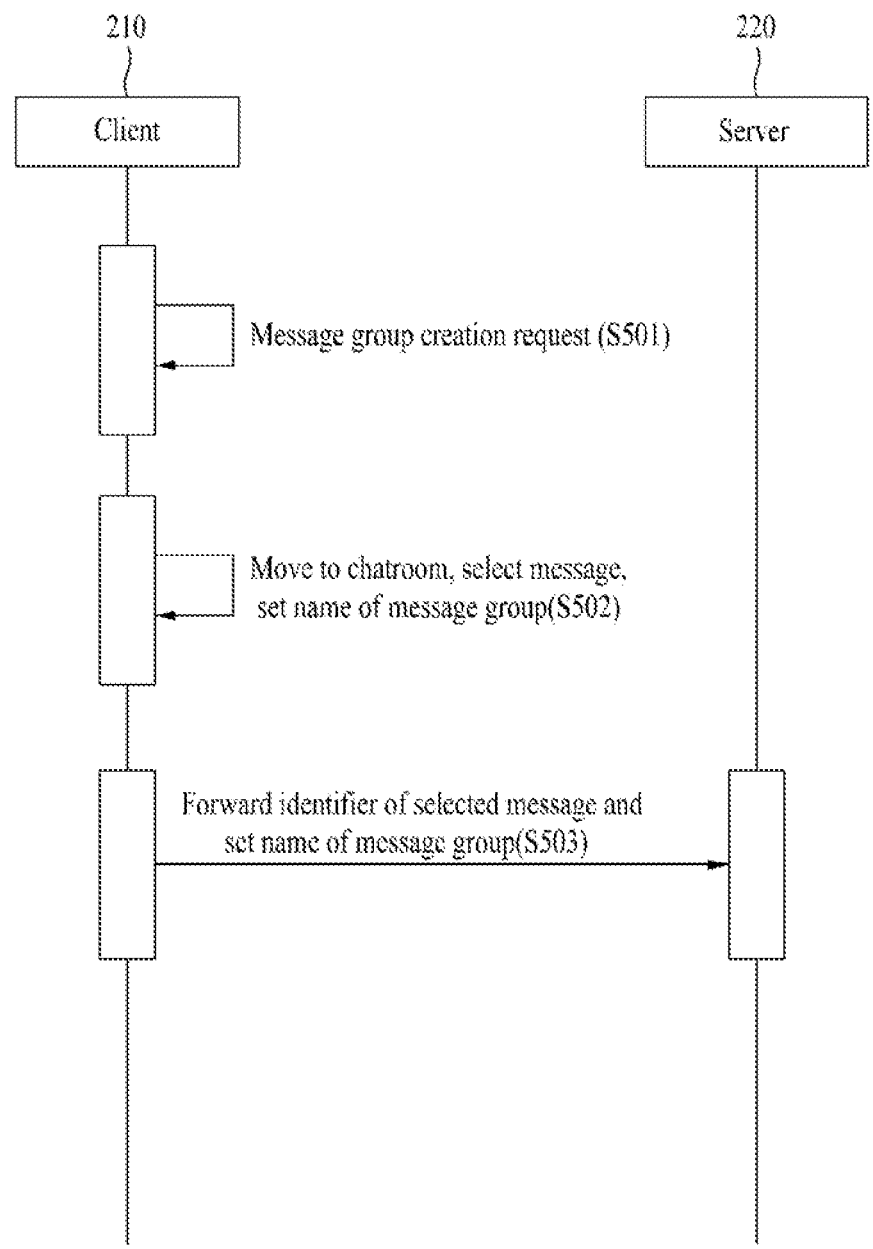
FIG. 5 shows an example of a message group creation procedure according to example embodiments.

FIG. 5 shows an example of a message group creation procedure according to example embodiments, and FIGS. 6, 7, 8, and 9 show examples of a screen of a user interface related to a message group creation procedure according to example embodiments.

Figure 6:
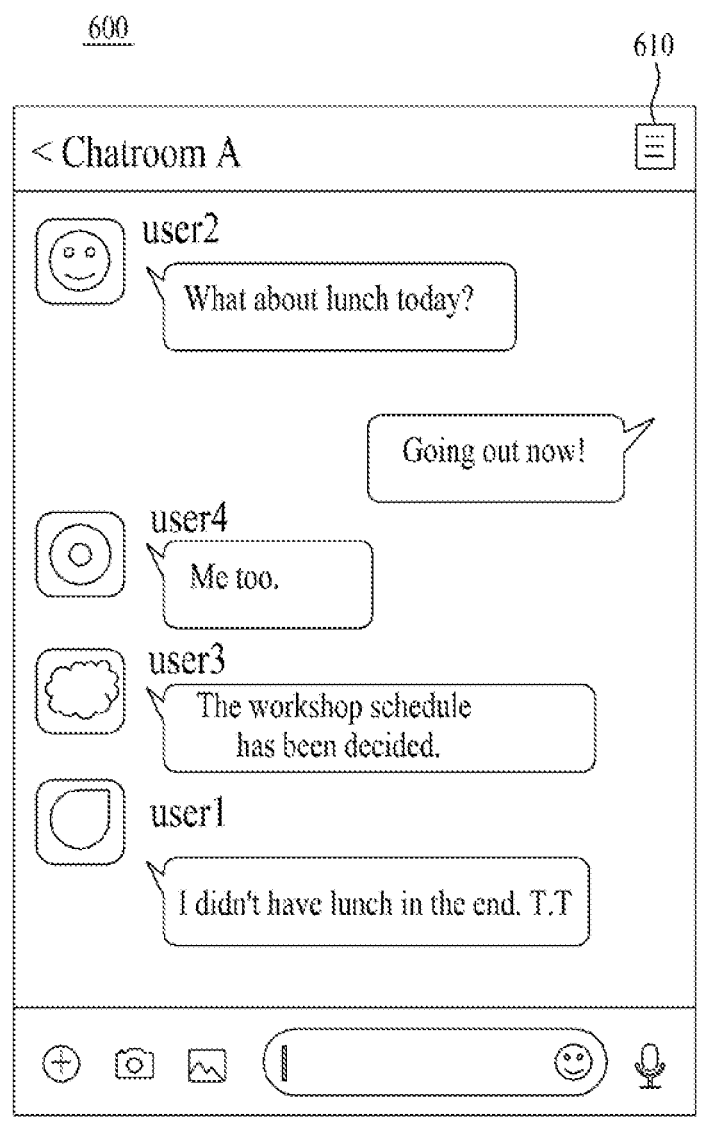
FIGS. 6, 7, 8, and 9 show examples of a screen of a user interface related to a message group creation procedure according to example embodiments.
Figure 7:
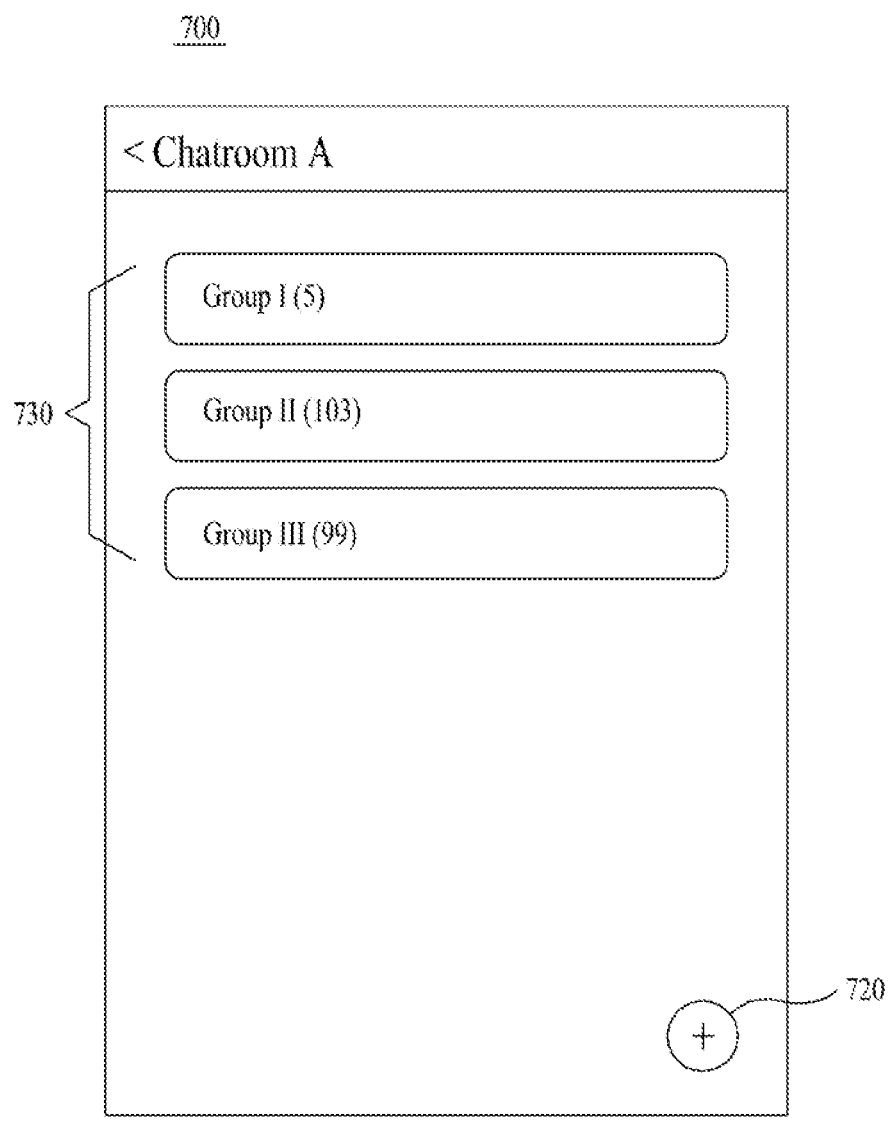

Referring to FIG. 5, in operation S501, the client device 210 (hereinafter, also referred to as "client 210") may receive a message group creation request from a user of a messenger. The client device 210 may receive a user request for creating a new message group through a service channel that provides a message management function in a chatroom. FIG. 6 shows an example of a chatroom interface 600 of a chatroom in which at least two users participate. The chatroom interface 600 may include a note menu 610 for accessing a message management environment. Referring to FIG. 7, in response to a selection of the note menu 610 of the chatroom interface 600, a user may move to a message management screen 700 of the chatroom interface 600. The message management screen 700 may include a group creation menu 720 for creating a new message group. The client device 210 may receive a message group creation request through the group creation menu 720 on the message management screen 700 of the chatroom interface 600.

Figure 8:
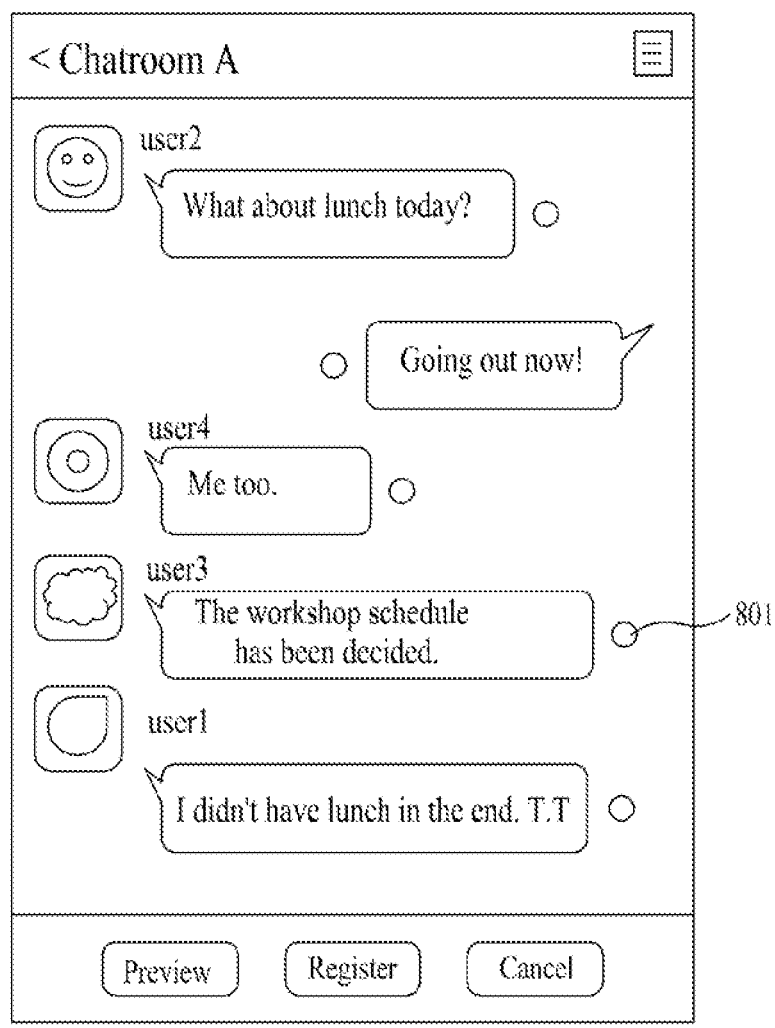
Figure 9:
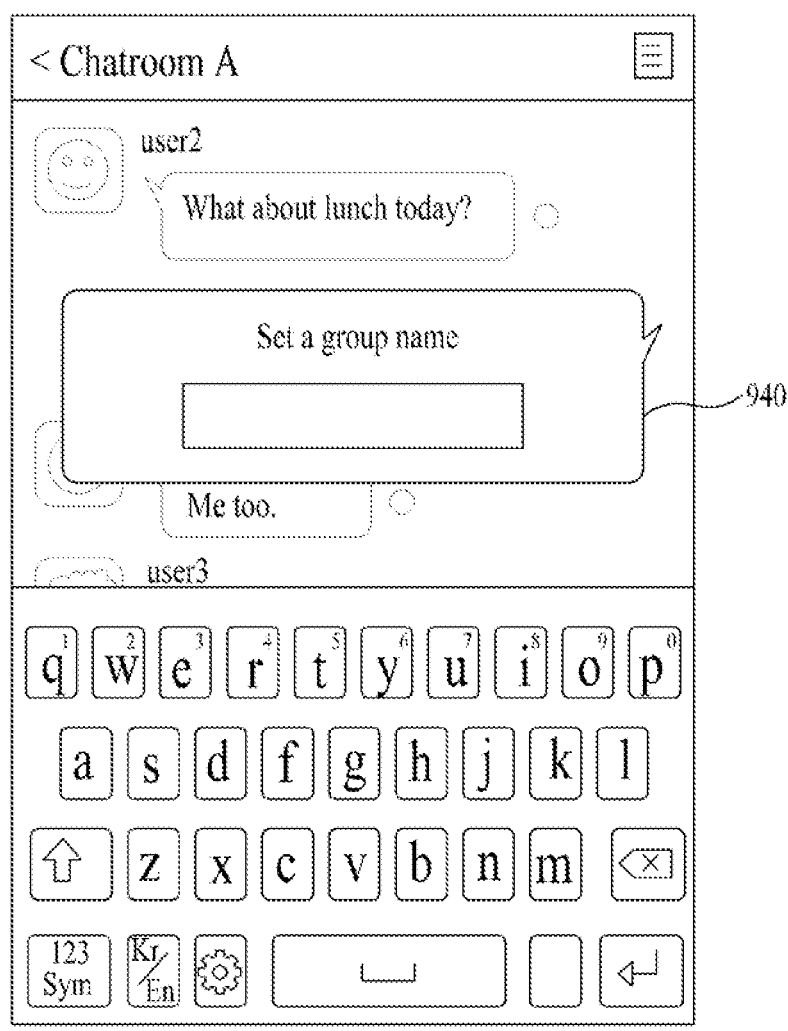

Referring again to FIG. 5, in operation S502, the client device 210 may move to a chatroom to which a service channel used to receive the message group creation request belongs and then may select at least one message from among messages included in the corresponding chatroom and set a name of a message group. The client device 210 may create the message group by selecting messages in the chatroom and may set a name of the message group when creating the message group. Referring to FIG. 8, in response to a selection on the group creation menu 720 on the message management screen 700 of FIG. 7, the user may move again to an interface screen for selecting a message to be grouped, for example, to the chatroom interface 600. Here, in the message management environment, the chatroom interface 600 provides an interface for selecting at least one message from among messages included in the chatroom. For example, the chatroom interface 600 may provide, for each message, a selection button 801 for selecting a message. The user may select a message that the user desires to group from among messages included in the chatroom interface 600 using the selection button 801. Referring to FIG. 9, once a selection on a message to be grouped is completed, a name setting screen 940 may be displayed on the chatroom interface 600 and a name of the message group grouped with the selected messages may be set through the name setting screen 940.

Referring again to FIG. 5, in operation S503, the client device 210 may forward, to the server 220, an identifier of the message selected for grouping and a name of the message group as information about the message group. The server 220 may store an identifier of the grouped messages in a data structure and may manage the same as the message group. A message group created by a single user of the chatroom may be registered in association with a service channel of the chatroom to which the message group belongs and shared with other users that participate in the corresponding chatroom.

Figure 10:
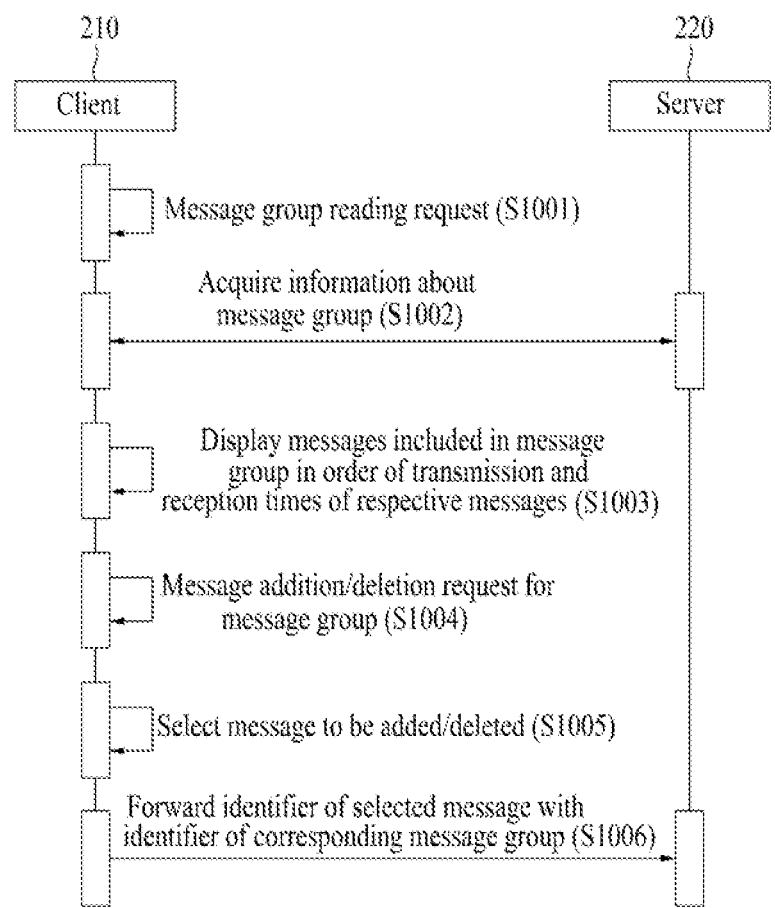
FIG. 10 shows an example of a message group reading and modifying procedure according to example embodiments.

FIG. 10 shows an example of a message group reading and modifying procedure according to example embodiments.

Referring to FIG. 10, in operation S1001, the client device 210 may receive a reading request for a specific message group among message groups that belong to a chatroom. Referring to FIG. 7, in response to a selection on the note menu 610 in the chatroom interface 600 of FIG. 6, the user may move to the message management screen 700 in the chatroom 600. Here, a message group list 730 previously created for the chatroom 600 may be included in the message management screen 700. The message group list 730 shows names set by one or more users having created a message groups when creating the corresponding message group, in a form of a list. The user may forward the reading request by selecting a message group that the user desires to read, that is, view from the message group list 730.

Referring again to FIG. 10, in operation S1002, the client device 210 may acquire, from the server 220, information about the message group that the user requests to view. The message group may be registered and managed in association with the chatroom to which the corresponding message group belongs on the server 220. The server 220 may forward message information of the message group corresponding to the request from the client 210.

Figure 11:
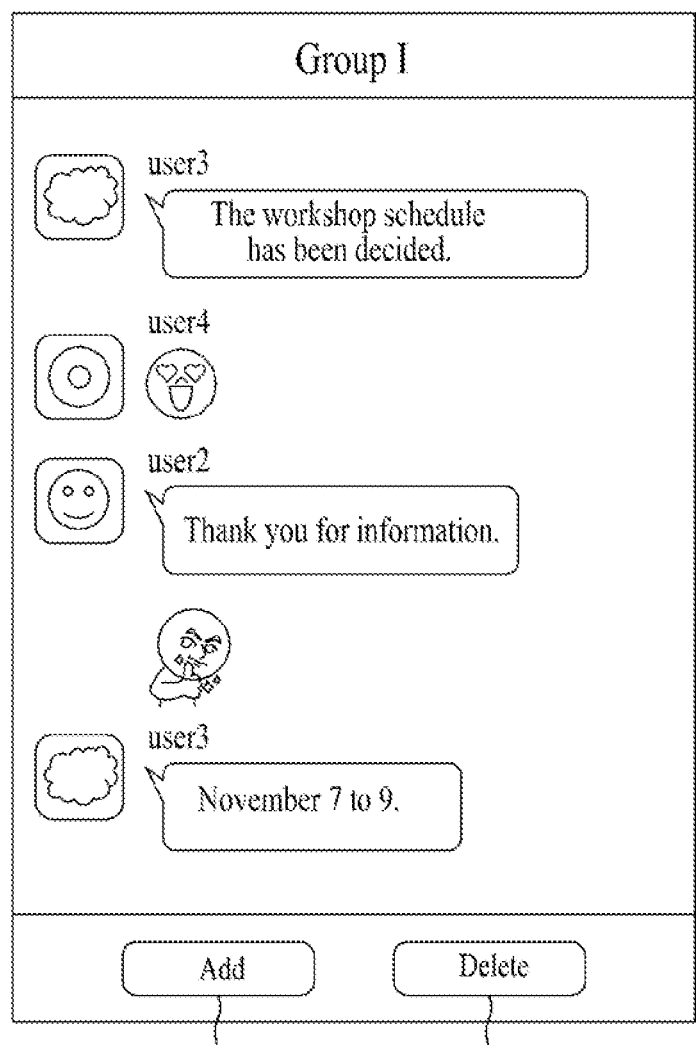
FIG. 11 shows an example of a screen of a user interface related to a message group reading and modifying procedure according to example embodiments.

In operation S1003, the client device 210 may display messages included in the message group requested by the user in order of transmission and reception times of the respective messages based on message information acquired from the server 220. In response to a selection on the specific message group, for example, "Group I," from the message group list 730 of FIG. 7, a message group reading screen 1100 of FIG. 11 may be provided. The client device 210 may configure the message group reading screen 1100 for reading. That is, the client 210 may display the message group as a user interface in a form identical or similar to the chatroom interface 600 and may display messages included in the message group through the message group reading screen 1100 based on message information transferred from the server 220.

Referring again to FIG. 10, in operation S1004, the client device 210 may receive a message addition/deletion request for the specific message group among message groups that belong to the chatroom. The message group reading screen 1100 of FIG. 11 may include an addition selector 1102 which accesses an addition interface for adding another message included in the chatroom to the message group and a deletion selector 1103 which access a deletion interface for deleting a message included in the message group as user interfaces for modifying the message group. The client 210 may receive a message addition request through the addition selector 1102 and a message deletion request through the deletion selector 1103 on the message group reading screen 1100.

Referring again to FIG. 10, in operation S1005, the client device 210 may select a message to be added to or deleted from the message group. In response to selecting the addition selector 1102 on the message group reading screen 1100 of FIG. 11, the client device 210 may move again to an interface screen for selecting a message to be added, for example, the chatroom interface 600 of FIG. 8. In the message management environment, the chatroom interface 600 provides an interface for selecting at least one message from among messages included in the chatroom. For example, the chatroom interface 600 may provide the selection button 801 for selecting a message for each message. For a message that is already added to the message group among the messages included in the chatroom 600, the selection button 801 may not be provided or the selection button 801 may be in an inactive state that disallows a selection may be provided. In response to selecting the deletion selector 1103 on the message group reading screen 1100 of FIG. 11, the chatroom 600 may provide a deletion interface for selecting a message to be deleted from the corresponding message group on the message group reading screen 1100.

Referring again to FIG. 10, in operation S1006, the client device 210 may forward an identifier of the message selected to modify (message addition/deletion) the message group to the server 220 with an identifier of the corresponding message group. The server 220 may receive the identifier of the message to be added to or deleted from the message group and may update the corresponding message group.

Further, the client device 210 may store time information about a most recent time at which the user has viewed (i.e. read the message group for each message group, hereinafter, referred to as a "last reading time") and may display a message that is newly added to or deleted from the message group and an unread message that is not read by the user to be distinguished from other messages based on the last reading time.

Figure 12:
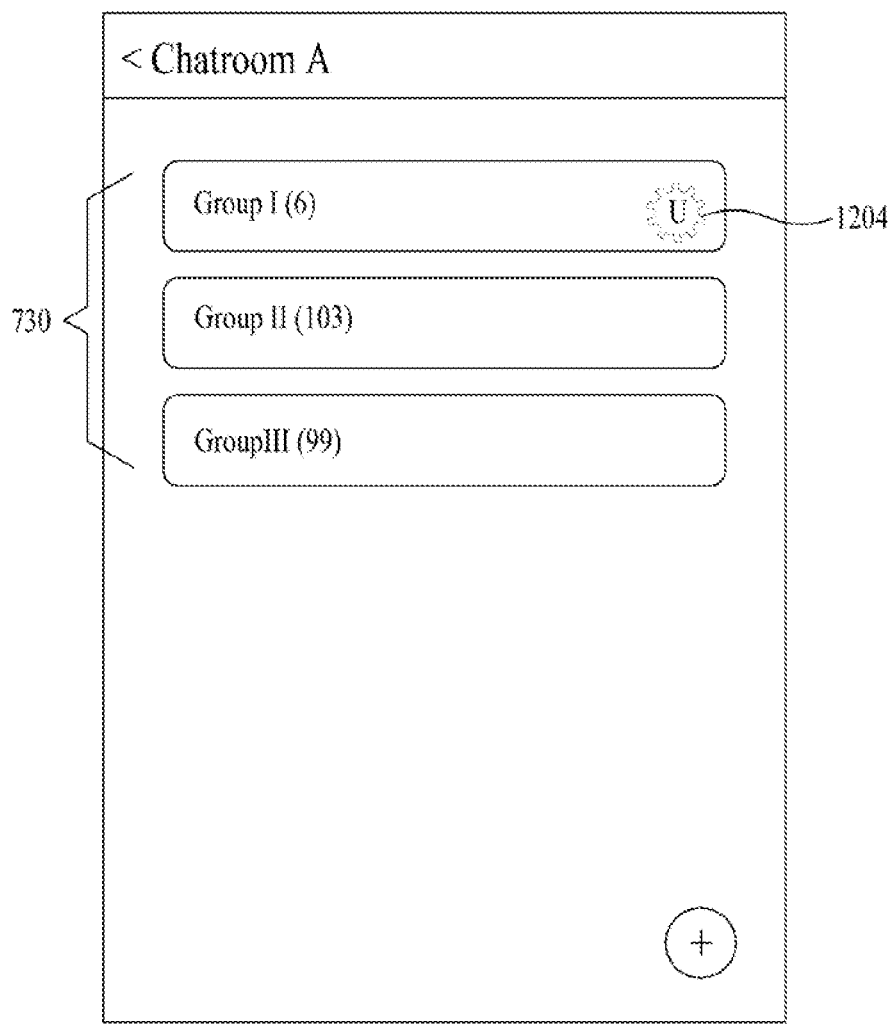
FIGS. 12, 13, and 14 show examples of a screen of a user interface related to a message to be added/deleted to/from a message group according to example embodiments.

For example, the client 210 may compare a last reading time of a message group and an update time (UpdatedTime) of each message included in the corresponding message group, and may determine presence or absence of a newly added/deleted message in the message group and may provide an update notification of the message group accordingly. Referring to FIG. 12, the message management screen 700 may include the message group list 730 created for the chatroom. Here, a notification badge 1204 may be displayed for a message group that includes the newly added/deleted message. The notification badge 1204 may be displayed as a different message by distinguishing an update notification according to a message addition and an update notification according to a message deletion.

Figure 13:
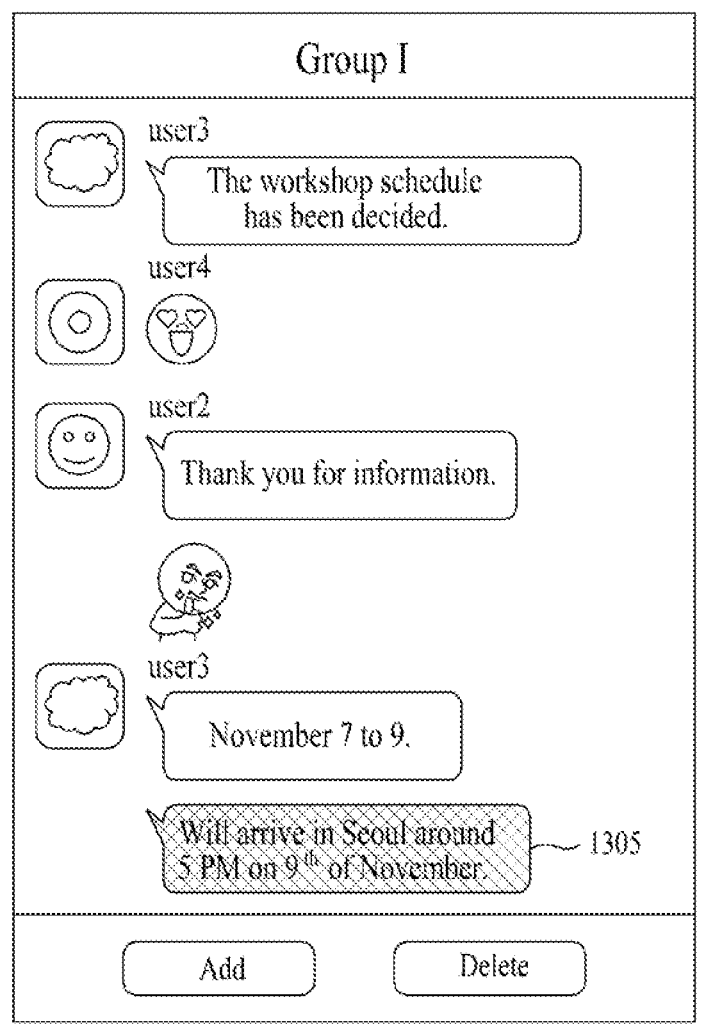
Figure 14:
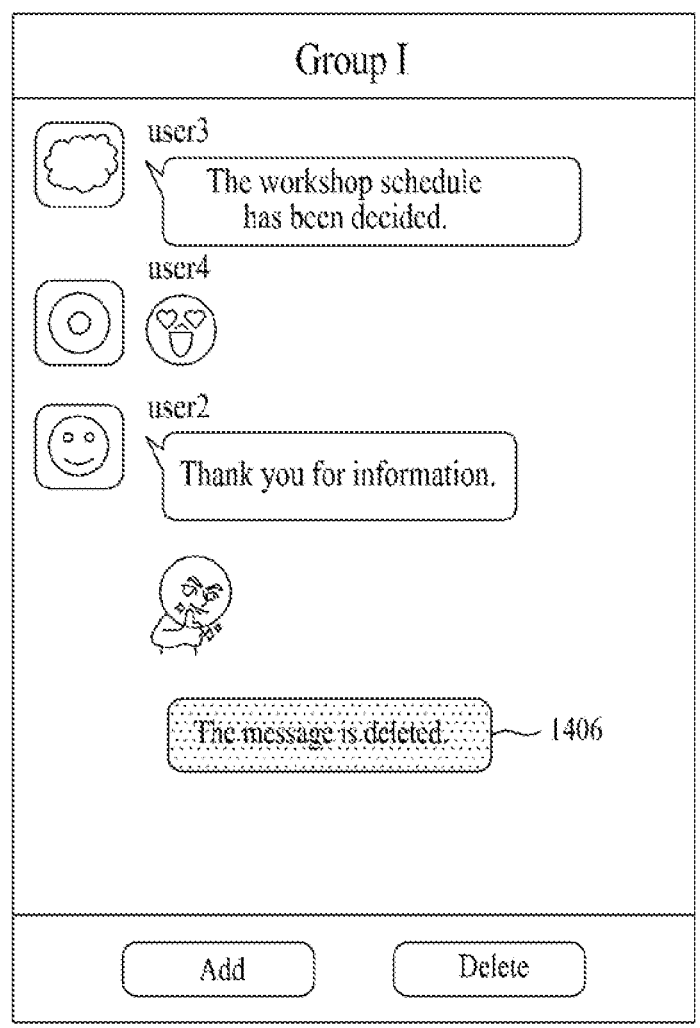

In response to a selection on a message group marked with the notification badge 1204 from the message group list 730, the message group reading screen 1100 may be provided. Here, referring to FIG. 13, a message 1305 added after the last reading time in the corresponding message group may be displayed to be distinguished from existing messages (i.e. having a different graphic effect). Referring to FIG. 14, in the case of a message being deleted after the last reading time in the corresponding message group, information 1406 representing the deleted message may be displayed at a position of the deleted message instead of contents of the message and may be displayed with a different graphic effect than non-deleted messages.

When a new message group is created for the chatroom, in addition to the update notification according to the message addition/deletion, a notification for the newly created message group may be provided through an interface related to the corresponding chatroom.

Figure 15:
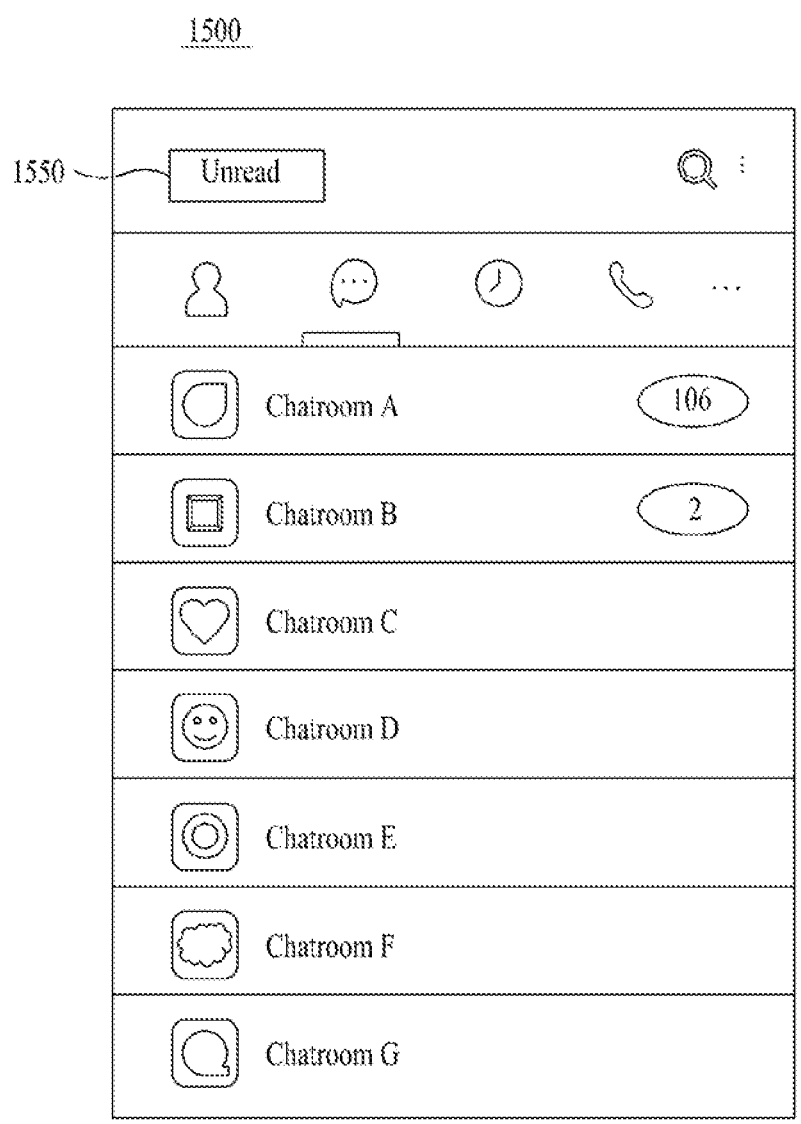
FIGS. 15, 16, and to 17 show examples of a screen of a user interface related to an unread message of a message group according to example embodiments.

As another example, the client device 210 may compare a last reading time of a message group and a transmission and reception time of each message included in the corresponding message group, may determine presence or absence of an unread message in the message group, and may provide a notification for the unread message in the message group accordingly. Referring to FIG. 15, an interface screen 1500 of a messenger, such as, for example, a friend list screen, a chatroom list screen, and an environment setting screen, may include an unread menu 1550 for verifying an unread message in the message group.

Figure 16:
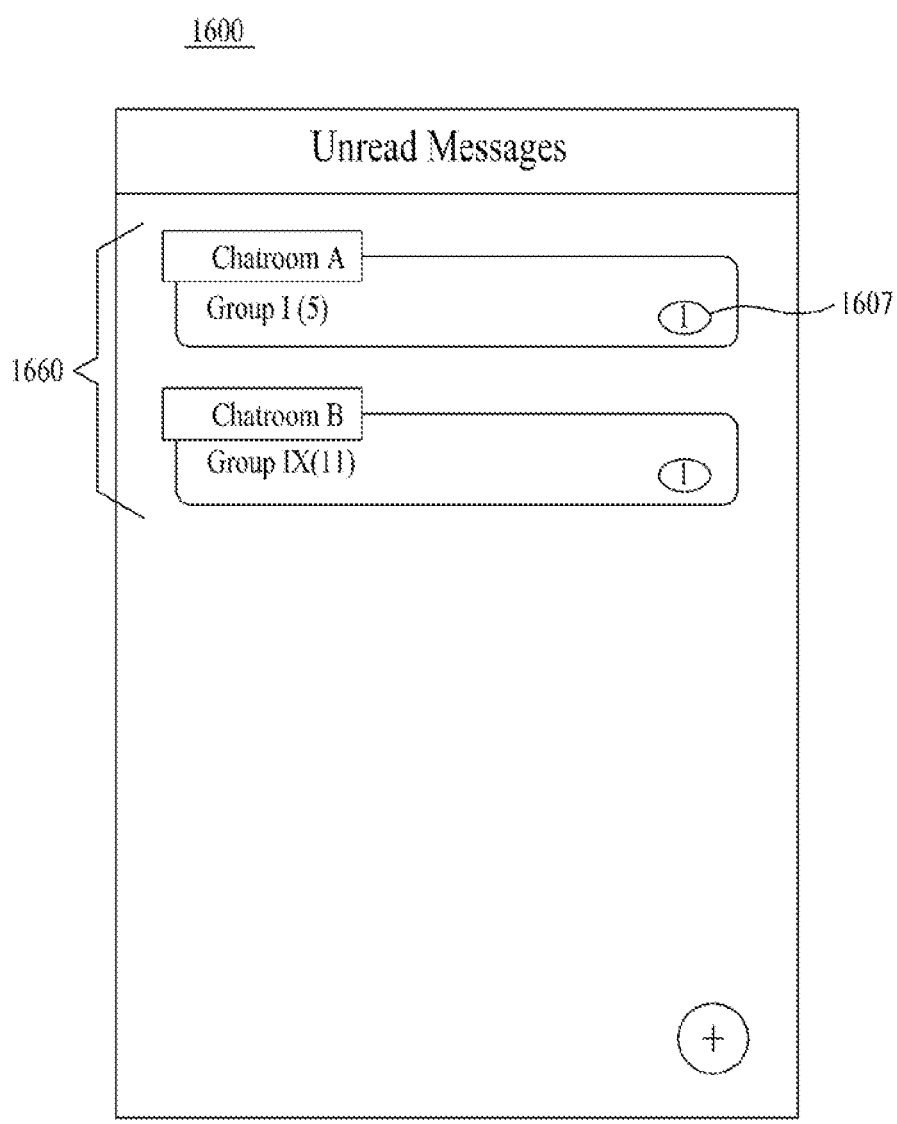
Figure 17:
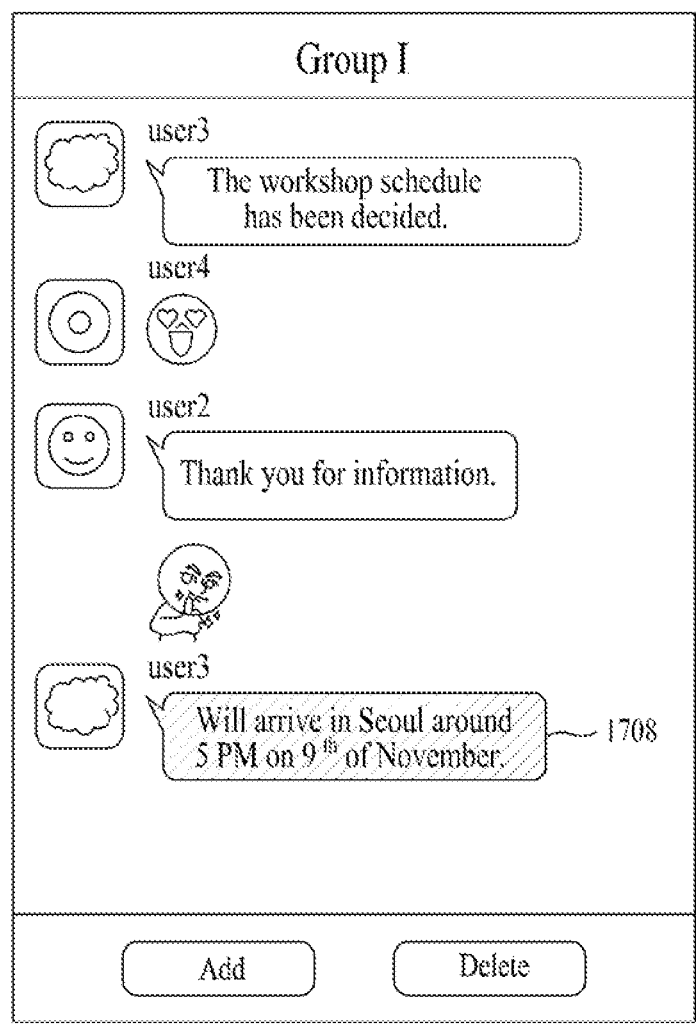

Referring to FIG. 16, in response to a selection from the user on the unread menu 1550 on the messenger interface screen 1500 of FIG. 15, the client device 210 may provide a message group list 1660 that includes an unread message through a management screen 1600 separate from the chatroom. The message group list 1660 may include information about a chatroom to which each message group belongs, such as, for example, a chatroom name, and may include a notification badge 1607 representing a number of unread messages for each message group. Referring to FIG. 17, in response to a selection on a specific message group from the message group list 1660, the message group reading screen 1100 may be provided. Here, a message sent and received after a last reading time (i.e. an unread message 1708 in the corresponding message group) may be displayed to be distinguished from read messages.

Although it is described above that the client device 210 performs the message management method in response to an instruction provided from an application installed on the client device 210, the above is provided as an example only. Depending on example embodiments, the server 220 may directly perform the message management method through interaction with the application installed on the client device 210.

For the server 220 to perform the entire or a portion of the message management method of FIG. 4, the processor 222 of the server 220 may include a message group receiver and a message group sharer. Depending on example embodiments, the message group receiver and the message group sharer may be selectively included in or excluded from the processor 222. Also, depending on example embodiments, the components of the processor 222 may be separated or merged for functional representation of the processor 222.

The processor 222 and the components of the processor 222 may control the server 220 to perform operations S420 to S440 of FIG. 4. For example, the processor 222 and the components of the processor 222 may be configured to execute an instruction according to a code of at least one program and a code of an OS included in the memory 221.

The message group receiver and the message group sharer included in the processor 222 of the server 220 may perform operations S420 to S440 of FIG. 4 in a manner identical or corresponding to the aforementioned message group receiver 310 and message group sharer 320. Therefore, further description related to the components of the processor 222 is omitted.

According to example embodiments, it is possible to provide a message management environment capable of grouping messages sent and received in a chatroom between users participating in the chatroom. It is possible to forward a message grouping in a chatroom to a server to share with another user participating in the corresponding chatroom or to freely add or delete a message to or from a message group. Therefore, a message group may be created and modified by users participating in a chatroom and grouping with high accuracy may be provided for each topic. Also, message management environment may provide chat contents of messages grouped for each topic, that can be quickly understood, without verifying the entire messages in a chatroom.

The systems or the apparatuses described herein may be implemented using hardware components, software components, and/or a combination thereof. For example, a processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A message management method comprising:
   receiving, by at least one processor of a computer system, a share request for a first message group that comprises at least one message among messages in a chatroom;
   forwarding, by the at least one processor, based on receiving the share request, information about the first message group to a server which stores the information about the first message group in association with the chatroom and shares the first message group with users in the chatroom;
   based on a message group reading request being received on a first screen that displays the chatroom, switching the first screen to a second screen displaying a list of a plurality of message groups that are associated with the chatroom and that comprises the first message group and a second message group, wherein the plurality of message groups have a respective group identifier, and the first message group and the second message group have a first group identifier and a second group identifier, respectively;
   based on a selection of the first message group from the list of the plurality of message groups displayed in the second screen, identifying messages that belong to the first message group based the first group identifier via interaction with the server, and displaying the messages having the first group identifier as belonging to the first message group; and
   based on a selection of the second message group from the list of the plurality of message groups displayed in the second screen, identifying messages that belong to the second message group based on the second group identifier via interaction with the server, and displaying the messages having the second group identifier as belonging to the second message group.

2. The message management method of claim 1, wherein the receiving comprises:
   grouping the messages in the chatroom, based on a message time, into the first message group;
   displaying, by a user interface of the computer system, the list of the plurality of message groups comprising the first message group; and
   receiving, through the user interface, a specific user input which selects the first message group from among the plurality of message groups.

3. The message management method of claim 1, wherein the receiving comprises:
   grouping the messages in the chatroom, based on a keyword input from a user, into the first message group;
   displaying, by a user interface of the computer system, the list of the plurality of message groups comprising the first message group; and
   receiving, through the user interface, a specific user input which selects the first message group from among the plurality of message groups.

4. The message management method of claim 1, wherein the receiving comprises:
   displaying, by a user interface of the computer system, at least one editing message to be added to or to be deleted from the first message group; and
   receiving, through the user interface, a selection of the at least one editing message.

5. The message management method of claim 1, further comprising:
   displaying an icon for switching the first screen to the second screen in a user interface of the chatroom; and
   upon the icon being selected, switching the first screen to the second screen to display the list of the plurality of message groups that are associated with the chatroom.

6. The message management method of claim 1, further comprising:
   storing a last reading time of the first message group; and
   displaying the at least one message in the first message group with a different graphic effect than remaining messages in the first message group based on the last reading time.

7. The message management method of claim 1, wherein each message in the first message group comprises time information that is updated for the first message group, and the message management method further comprises:
   comparing a last reading time of the first message group and the time information;
   determining, based on comparison of the last reading time and the time information, a presence or an absence of a message updated after the last reading time in the first message group; and
   displaying a background color of a first chat bubble containing the message updated after the last reading time, differently from a background color of a second chat bubble containing a previously existing message in the first message group.

8. The message management method of claim 1, further comprising:
comparing a message time for each message and a last reading time of the first message group;
determining, based on the message times and the last reading time, a presence or an absence of an unread message in the first message group; and
displaying, based on determining the presence of the unread message, a background color of a first chat bubble containing the unread message, differently from a background color of a second chat bubble containing a read message in the first message group.

9. A non-transitory computer-readable record medium storing instructions that, when executed by the at least one processor, causes the at least one processor to perform the message management method of claim 1.

10. The message management method of claim 1, wherein the messages having the first group identifier and the messages having the second group identifier have different message identifiers from each other.

11. A computer system comprising:
a memory configured to store computer-readable instructions; and
at least one processor configured to execute the computer-readable instructions to:
receive a share request for a first message group that includes at least one message among messages in a chatroom;
forward, based on receiving the share request, information about the first message group to a server which stores the information about the first message group in association with the chatroom and shares the first message group with users in the chatroom;
based on a message group reading request being received on a first screen that displays the chatroom, switch the first screen to a second screen displaying a list of a plurality of message groups that are associated with the chatroom and that comprises the first message group and a second message group, wherein the plurality of message groups have a respective group identifier, and the first message group and the second message group have a first group identifier and a second group identifier, respectively;
based on a selection of the first message group from the list of the plurality of message groups, acquire the information about the first message group from the server displayed in the second screen, identifying messages that belong to the first message group based the first group identifier via interaction with the server, and displaying the messages having the first group identifier as belonging to the first message group; and
based on a selection of the second message group from the list of the plurality of message groups displayed in the second screen, identifying messages that belong to the second message group based on the second group identifier via interaction with the server, and displaying the messages having the second group identifier as belonging to the second message group.

12. The computer system of claim 11, wherein the at least one processor is further configured to:
group the messages in the chatroom, based on a message time or a keyword input from a user; into the first message group;
control a user interface to display the list of the plurality of message groups comprising the first message group; and
receive, through the user interface, a specific user input which selects the first message group from among the plurality of message groups.

13. The computer system of claim 11, wherein the at least one processor is further configured to:
control a user interface to display at least one editing message to be added to or to be deleted from the first message group, and
receive, through the user interface, a selection of the at least one editing message.

14. The computer system of claim 11, wherein the at least one processor is further configured to;
control a user interface to display an icon for switching the first screen to the second screen in the chatroom; and
upon the icon being selected, switch the first screen to the second screen to display the list of the plurality of message groups that are associated with the chatroom.

15. The computer system of claim 11, wherein the at least one processor is further configured to:
store a last reading time of the first message group; and
control a user interface to display the at least one message in the first message group with a different graphic effect than remaining messages in the first message group based on the last reading time.

16. The computer system of claim 11, wherein each message in the first message group comprises time information that is updated for the first message group, and
the at least one processor is further configured to:
compare a last reading time of the first message group and the time information; and
control a user interface to display a background color of a first chat bubble containing a message updated after the last reading time, differently from a background color of a second chat bubble containing a previously existing message in the first message group.

17. The computer system of claim 11, wherein the at least one processor is further configured to:
compare a message time for each message and a last reading time of the first message group;
determine, based on the message times and the last reading time, a presence or an absence of an unread message in the first message group; and
control a user interface to display, based on determining the presence of the unread message, a background color of a first chat bubble containing the unread message differently from a background color of a second chat bubble containing a read message in the first message group.

18. A message management method comprising:
receiving, by a server, information about a first message group that comprises at least one message among messages in a chatroom;
storing, by the server, the information about the first message group in association with the chatroom;
based on a message group reading request being received on a first screen of an electronic device that displays the chatroom, enabling the electronic device to switch the first screen to a second screen displaying a list of a plurality of message groups that are associated with the chatroom and that comprises the first message group and a second message group, wherein the plurality of message groups have a respective group identifier, and the first message group and the second message group have a first group identifier and a second group identifier, respectively;

based on a selection of the first message group from the list of the plurality of message groups, displayed in the second screen, identifying messages that belong to the first message group based the first group identifier via interaction with the server, and displaying the messages having the first group identifier as belonging to the first message group; and based on a selection of the second message group from the list of the plurality of message groups displayed in the second screen, identifying messages that belong to the second message group based on the second group identifier via interaction with the server, and displaying the messages having the second group identifier as belonging to the second message group.

19. The message management method of claim 18, wherein the sharing comprises sharing the first message group through a service channel allocated to the chatroom.

\* \* \* \* \*